US012633762B2

(12) United States Patent
Cahill et al.

(10) Patent No.: US 12,633,762 B2
(45) Date of Patent: May 19, 2026

(54) POWER DISTRIBUTION WITHIN RECONFIGURABLE BATTERY SYSTEM

(71) Applicant: Analog Devices International Unlimited Company, Limerick (IE)

(72) Inventors: Alan Patrick Cahill, Edinburgh (GB); Uwe Broeckelmann, Issing (DE)

(73) Assignee: Analog Devices International Unlimited Company, Limerick (IE)

( * ) Notice: Subject to any disclaimer, the term of this patent is extended or adjusted under 35 U.S.C. 154(b) by 944 days.

(21) Appl. No.: 17/821,083

(22) Filed: Aug. 19, 2022

(65) Prior Publication Data

US 2023/0064473 A1 Mar. 2, 2023

Related U.S. Application Data

(60) Provisional application No. 63/238,637, filed on Aug. 30, 2021.

(51) Int. Cl.
| | |
|---|---|
| *H02J 7/00* | (2026.01) |
| *B60L 50/60* | (2019.01) |
| *B60L 58/22* | (2019.01) |
| *H01M 10/48* | (2006.01) |

(52) U.S. Cl.
CPC ............ *H02J 7/0016* (2013.01); *B60L 50/60* (2019.02); *B60L 58/22* (2019.02); *H01M 10/482* (2013.01); *H02J 7/0029* (2013.01)

(58) Field of Classification Search
CPC .......... H02J 7/0016; B60L 50/60; B60L 58/22
See application file for complete search history.

(56) References Cited

U.S. PATENT DOCUMENTS

| | | | |
|---|---|---|---|
| 8,547,065 | B2 | 10/2013 | Trigiani |
| 9,381,822 | B2 | 7/2016 | Scheucher |
| 10,044,069 | B2 | 8/2018 | Despesse |
| 10,109,888 | B2 | 10/2018 | Scheucher |
| 10,122,186 | B2 | 11/2018 | Nystrom et al. |
| 10,305,298 | B2 | 5/2019 | Kristensen |
| 10,868,430 | B1 | 12/2020 | Hom et al. |
| 10,897,145 | B2 | 1/2021 | De Breucker et al. |
| 2017/0072803 | A1 | 3/2017 | Murai et al. |
| 2019/0115768 | A1* | 4/2019 | Taylor, Jr. ............ H02J 7/0016 |
| 2019/0299799 | A1 | 10/2019 | Hinterberger et al. |
| 2021/0135461 | A1 | 5/2021 | Wang et al. |

FOREIGN PATENT DOCUMENTS

| | | |
|---|---|---|
| CN | 210881739 U | 6/2020 |
| CN | 112078366 A | 12/2020 |
| KR | 101743908 B1 | 6/2017 |
| WO | WO-2012158185 A1 | 11/2012 |

* cited by examiner

*Primary Examiner* — Robert Grant
(74) *Attorney, Agent, or Firm* — Schwegman Lundberg & Woessner, P.A.

(57) ABSTRACT

Described herein are techniques and mechanisms for modules in a battery stack to provide backup power to their neighbor modules thereby permitting the neighboring cell to activate bypass switches, which can effectively remove a module's associated battery cells from the charge/discharge loop and permit the battery to continue safe operations. This mechanism can be a cost-effective technique of providing backup power.

17 Claims, 11 Drawing Sheets

Time (ms)

POWER DISTRIBUTION WITHIN RECONFIGURABLE BATTERY SYSTEM

CLAIMS OF PRIORITY

This patent application claims the benefit of priority U.S. Provisional Patent Application Ser. No. 63/238,637, titled "POWER DISTRIBUTION WITHIN RECONFIGURABLE BATTERY SYSTEM," filed on Aug. 30, 2021, which is hereby incorporated by reference herein in its entirety.

TECHNICAL FIELD

The present disclosure generally relates to power distribution in a battery system, in particular power sharing mechanism within a reconfigurable battery system.

BACKGROUND

With the rapidly evolving technology of smart grid and electric vehicles (EVs), the rechargeable battery has emerged as a prominent energy storage device at scale. EVs have been gaining immense popularity.

One factor facilitating adoption of EVs has been improvement in battery management. Rechargeable batteries, being electrochemical in nature, may exhibit a variety of undesirable operational characteristics such as outgassing, leakage of electrolyte, or thermal issues such as overheating or exothermically reacting with oxygen. In other words, battery cells or modules in a battery stack can fail. In such a scenario, backup power is necessary to replace power normally provided by the impaired cell, to provide power to reconfigurable circuitry associated with that cell or module to ensure the overall integrity or operation of the battery pack. Providing backup power from outside a battery pack to each battery module can be difficult and costly considering that the modules can be sitting at a voltage potential several hundred volts apart within a battery pack.

SUMMARY

This disclosure describes a battery circuit. The battery circuit includes a first battery cluster of a battery stack, the first battery cluster including: a first battery cell, a first controller, a first set of switches coupled to the first battery cell to selectively couple the first battery cell to perform charging and discharging operations, and a configurable power source. The battery circuit also includes a second battery cluster of the battery stack, the second battery cluster including: a second battery cell, a second controller, and a second set of switches coupled to the second battery cell to selectively couple the second battery cell to perform charging and discharging operations. In the event the second battery cell is impaired, the configurable power source in the first battery cluster is configured to provide backup power to the second battery cluster to operate the second set of switches to bypass the second battery cell from the charging or discharging operations.

This disclosure also describes a method to provide safe operations of a battery stack, the method comprising: determining that a first module of a plurality of battery modules of the battery stack is impaired; providing backup power to the first module from a configurable power source in a second module of the plurality of battery modules based on determining that the first module is impaired; and removing the first module from a charge loop associated with the battery stack using the backup power provided by the configurable power source.

This disclosure further describes a battery module of a battery stack, the battery module comprising: a battery cell, a controller, a set of switches coupled to the battery cell to selectively couple the battery cell to perform charging and discharging operations of the battery stack, and a configurable power source to provide backup power to a neighboring module in the event the neighboring module is impaired.

BRIEF DESCRIPTION OF THE DRAWINGS

Various ones of the appended drawings merely illustrate example embodiments of the present disclosure and should not be considered as limiting its scope.

DETAILED DESCRIPTION

Described herein are techniques and mechanisms for modules in a battery stack to provide backup power to their neighbor modules thereby permitting the neighboring module to activate bypass switches, which can effectively remove a module's associated battery cells from the charge/discharge loop and permit the battery pack to continue safe operations. A module can be an assembly of at least two battery cells to a unit. In a module, multiple parallel and/or serial cells can be monitored and controlled by an associated battery management system, as described herein.

The backup power mechanism can be a cost-effective technique of providing backup power without using isolated power supplies from an external source and associated dedicated wiring to each module. A module can request or be instructed to provide power to a neighboring cell designated as impaired or failed. In some examples, the power charging of a neighboring module can be done using one or two wires between each module, making the implementation simple and cost-effective. In some examples, the impaired module can take power from a neighboring module without a request or instruction. Moreover, a module can provide backup power to a contiguous series of neighboring modules configured to be bypassed, i.e., supply power to more than one module or cell. Different implementations are described in further detail below.

The backup power supplying techniques described herein may be applicable to electric vehicle (EV) batteries as well as other battery applications such as energy storage systems.

In some EV battery systems, a battery generates a DC voltage (e.g., 400V-DC or 800V-DC), and the battery voltage is driving an inverter. The inverter converts the DC voltage from the battery to an AC voltage (e.g., 400V-AC). The electric motor is coupled to the inverter output and operates using the converted AC voltage. The inverter, however, leads to significant inverter switch and conduction losses particularly at partial load levels, as well as harmonic distortion and electromagnetic emissions. This can lead to lower system efficiency and require high cooling techniques.

An AC battery can be used to remove the need for the inverter. The AC battery can provide an AC voltage directly from the battery without an inverter. The AC battery may include a set of switches in H-Bridge configuration to switch the connections of the battery modules in the battery to generate a synthesized AC voltage. The AC battery may not include high voltage switching, such as an inverter, but may include lower voltage switching performed at the module level. Thus, the switching is typically at a lower frequency as compared to an inverter (e.g., 10-20 kHz), and heat from the switching is distributed over a larger area as compared to an inverter. Thus, the AC battery can be scalable while providing modularity benefits.

Figure 1A:
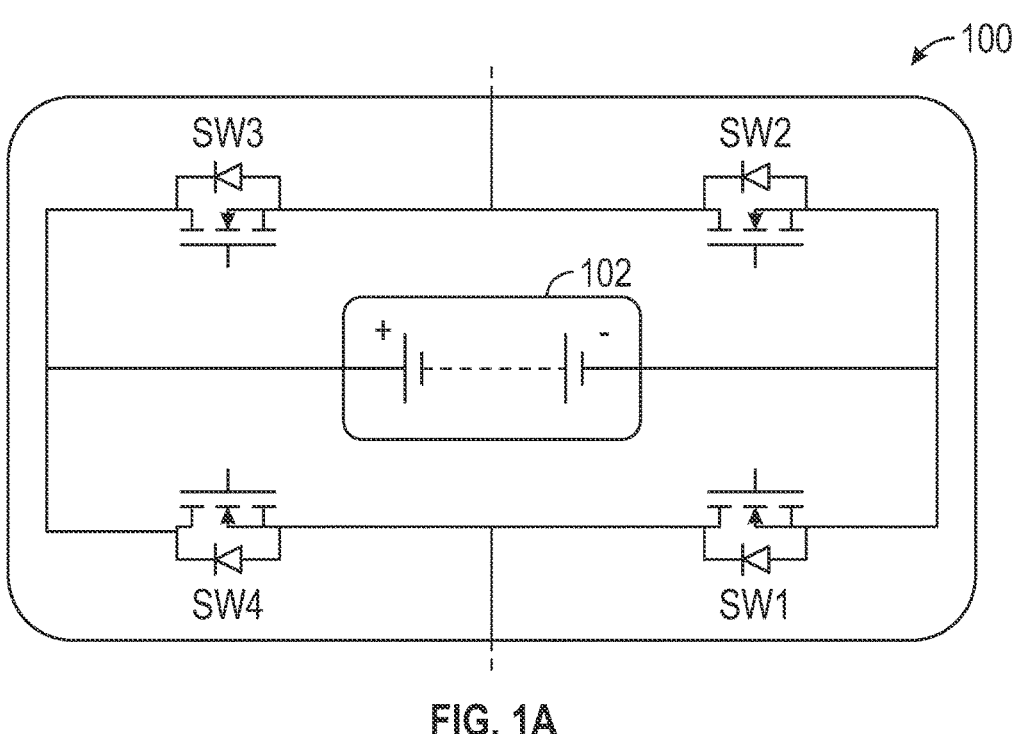
FIG. 1A illustrates example portions of a battery module of an AC battery.

FIG. 1A illustrates example portions of a battery module 100 of an AC battery. The battery module 100 (also referred to as a cluster) may include multiple battery cells 102 (herein battery cell may refer to one or more battery cells connected in series and/or parallel configurations) and a plurality of switches SW1-SW4. The battery cell 102 may be lithium-ion batteries. Batteries with different chemistries, specifications, sizes, and shapes may be used. The plurality of switches SW1-SW4 may be provided as transistors, such as a power field effect transistor (FET). In some examples, the switches may be provided as n-channel or p-channel MOSFET devices. The switches SW1-SW4 can be provided in a H-bridge configuration with respect to the battery cell 102.

The switches SW1-SW4 can be controlled and operated to provide a positive voltage or a negative voltage (with respect to terminal between SW1 and SW4). Additionally, switches SW1-SW4 can provide a bypass route to bypass the battery cell 102 in case of cell malfunction or impairment. To provide a positive voltage, SW1 and SW3 may be closed while switches SW2 and SW4 may remain opened. Thus, the current path may pass through SW3 to the cathode and then anode of the battery cell 102 and exit the module 100 via SW1. To provide a negative voltage, SW2 and SW4 may be closed while switches SW1 and SW3 may be open. Thus, the current path may pass through SW2 to the anode and then cathode of the battery cell 102 and exit the module 100 via SW4. To bypass the battery cell 102 in case of a malfunction, SW2 and SW1 may be closed while SW3 and SW4 are open to provide a bypass route taking the battery cell 102 from the charging/discharging loop, or, alternatively, SW3 and SW4 may be closed while SW1 and SW2 are on to provide an alternate bypass route.

Figure 1B:
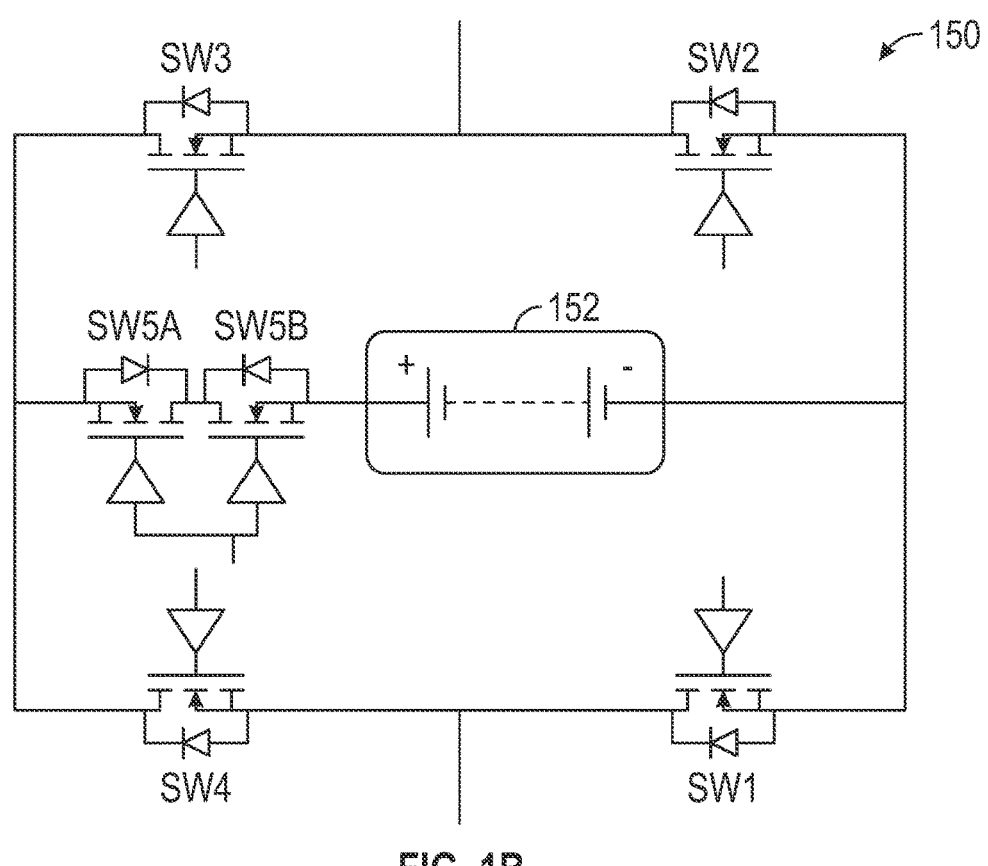
FIG. 1B illustrates example portions of a battery module of an AC battery.

Another switch may be added to the cluster to improve safety. FIG. 1B illustrates example portions of a battery module 150 of an AC battery. The battery module 150 (also referred to as a cluster) may include a battery cell 152 and a plurality of switches SW1-SW5. SW1-SW4 may operate as described above with reference to FIG. 1A. FIG. 1B also shows the body diode configurations of the switches. In some examples, SW5 A/B may include two switches in back-to-back configuration, which can prevent battery cell 152 from being charged inadvertently. SW5 A/B can hinder current flowing into the battery cell 152 if the battery cell 152 has a hard short. Additionally, SW5 A/B can enable bypass in the event one of the other switches SW1-SW4 has a defect and is continuously shorted.

Figure 1C:
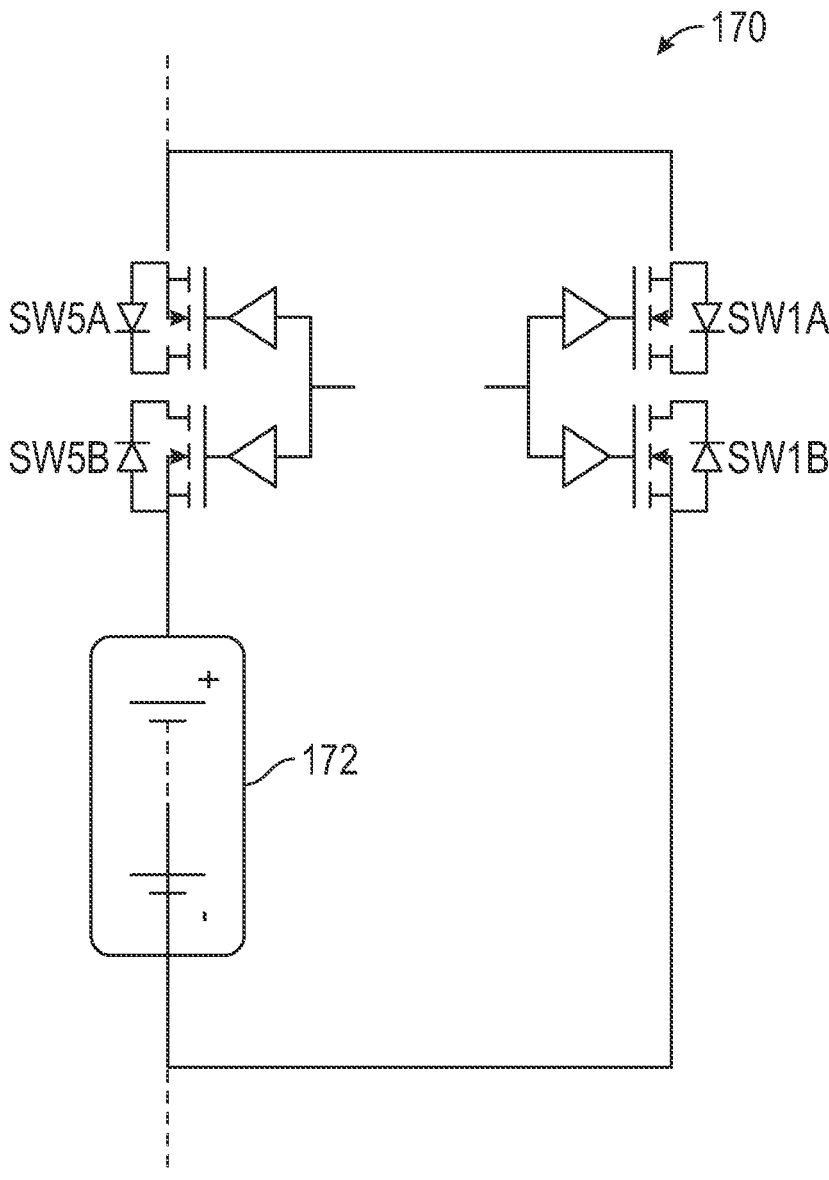
FIG. 1C illustrates example portions of a DC battery module with by-pass capability.

FIG. 1C illustrates example portions of a DC battery module 170 with by-pass capability. The DC battery module 172 may include a battery cell 172 and a plurality of switches SW1A/B and SW5 A/B. SW1 A/B may be provided as two switches in back-to-back configuration to provide by-pass capability. SW5 A/B may include two switches in back-to-back configuration with common control to prevent battery cell 172 from being charged inadvertently.

Figure 1D:
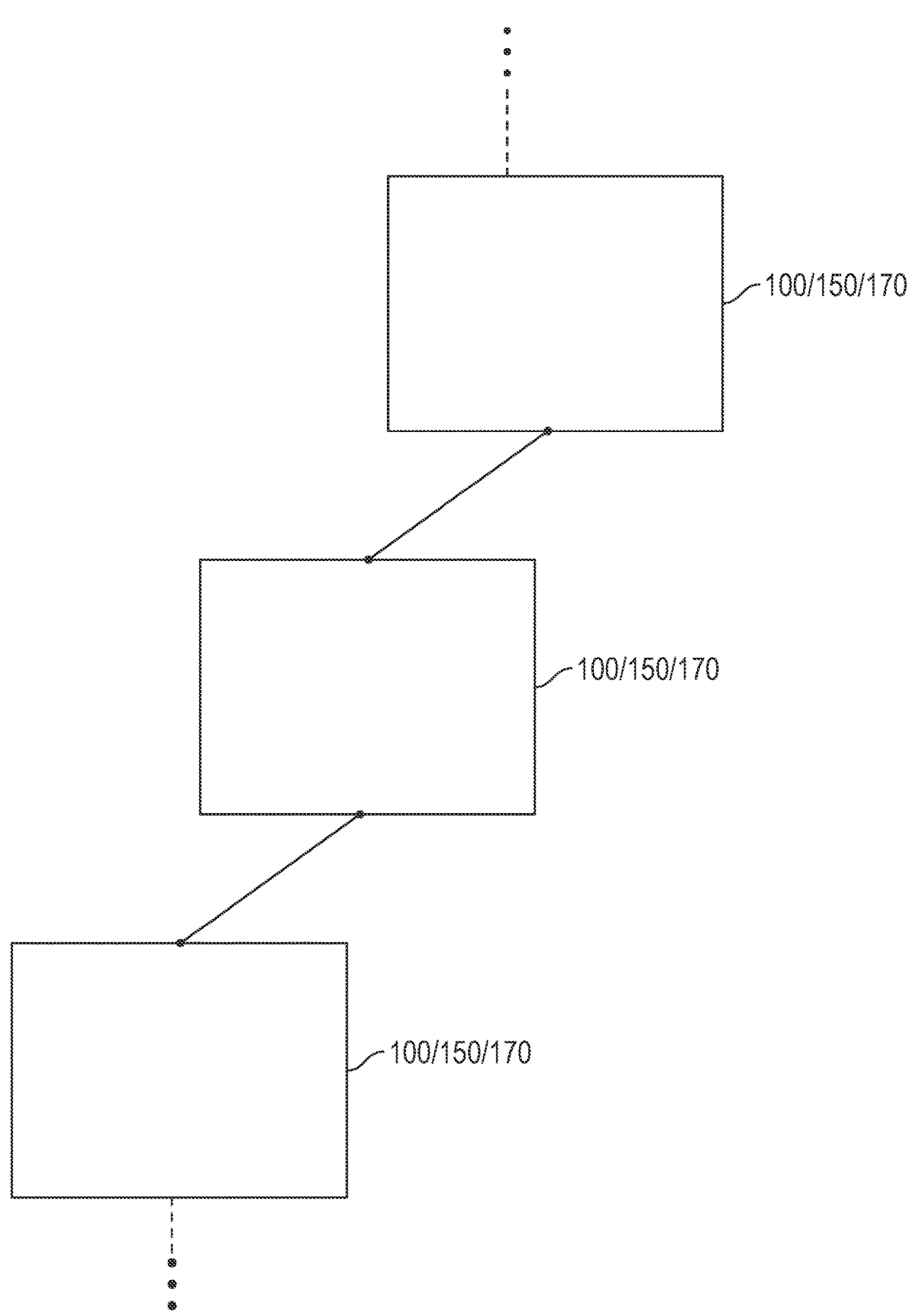
FIG. 1D illustrates example portions of a battery stack with a plurality of modules

FIG. 1D illustrates example portions of a battery stack with a plurality of modules. Each module may include several battery cells with switches arranged in a H bridge configuration as described above with reference to FIGS. 1A and 1B (e.g., modules 100/150) or modules with a by-pass switch as described above in FIG. 1C (e.g., module 170). Each module or cluster can generate a set voltage based on its battery cells, and the generated voltage from each module can be summed. For example, if each module generates 10V (with respect to the bottom terminal), then two activated modules in the same polarity can generate 20V, three activated modules in the same polarity can generate 30V, and so on. A controller (not shown) may control the operation of the modules as in FIGS. 1A and 1B to generate the synthesized AC voltage signals.

Figure 2:
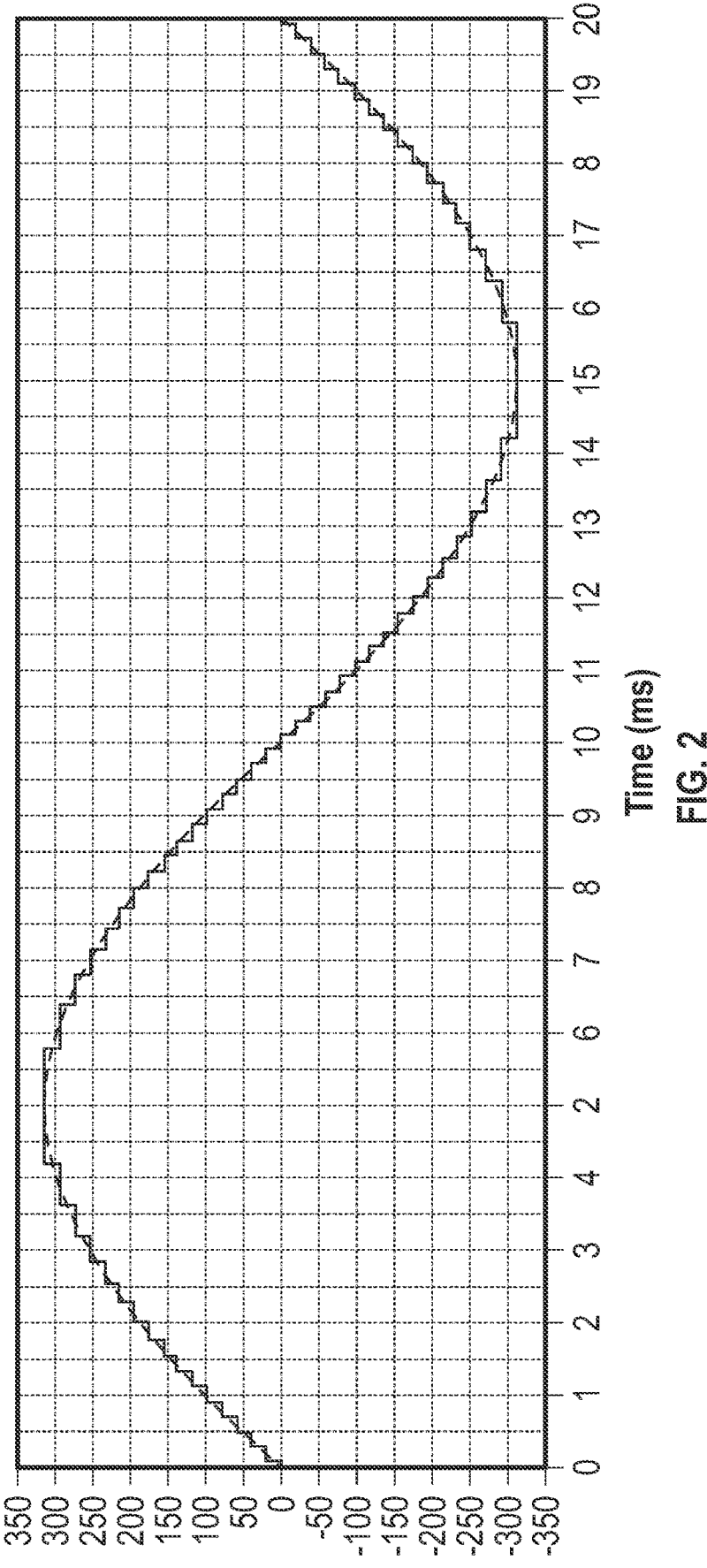
FIG. 2 illustrates an example of a synthesized AC voltage signal generated by an AC battery.

FIG. 2 illustrates an example of a synthesized AC voltage signal generated by an AC battery composed of 16 modules, with each module voltage potential equal to 20V. The synthesized AC voltage signal is shown as a 50 Hz waveform of approximately 225 Vrms; other frequency waveforms can also be generated. The synthesized AC voltage signal includes steps generated by the combination of coordinated activation of modules of the battery stack. Transitions are made asynchronously as compared to an ideal waveform. Battery management systems, in additional to the co-ordination above will also continuously monitor battery performance parameters at a module level to ascertain degrading or malfunctioning cells.

As described above, modules/clusters can malfunction. In the event of a module malfunction, the module may be bypassed so that the battery stack can still operate, albeit at a reduced peak capacity or power output. However, the bypass switches are typically powered by the battery cells within the respective module, and if a battery cell is significantly depleted because of the malfunction, the bypass switches may be inoperable. One option can be to wire each module to a backup isolated power supply (e.g., from 12 Volt battery) using transformers. However, this option has significant drawbacks because the transformers can take up valuable space and add significant cost.

Figure 3A:
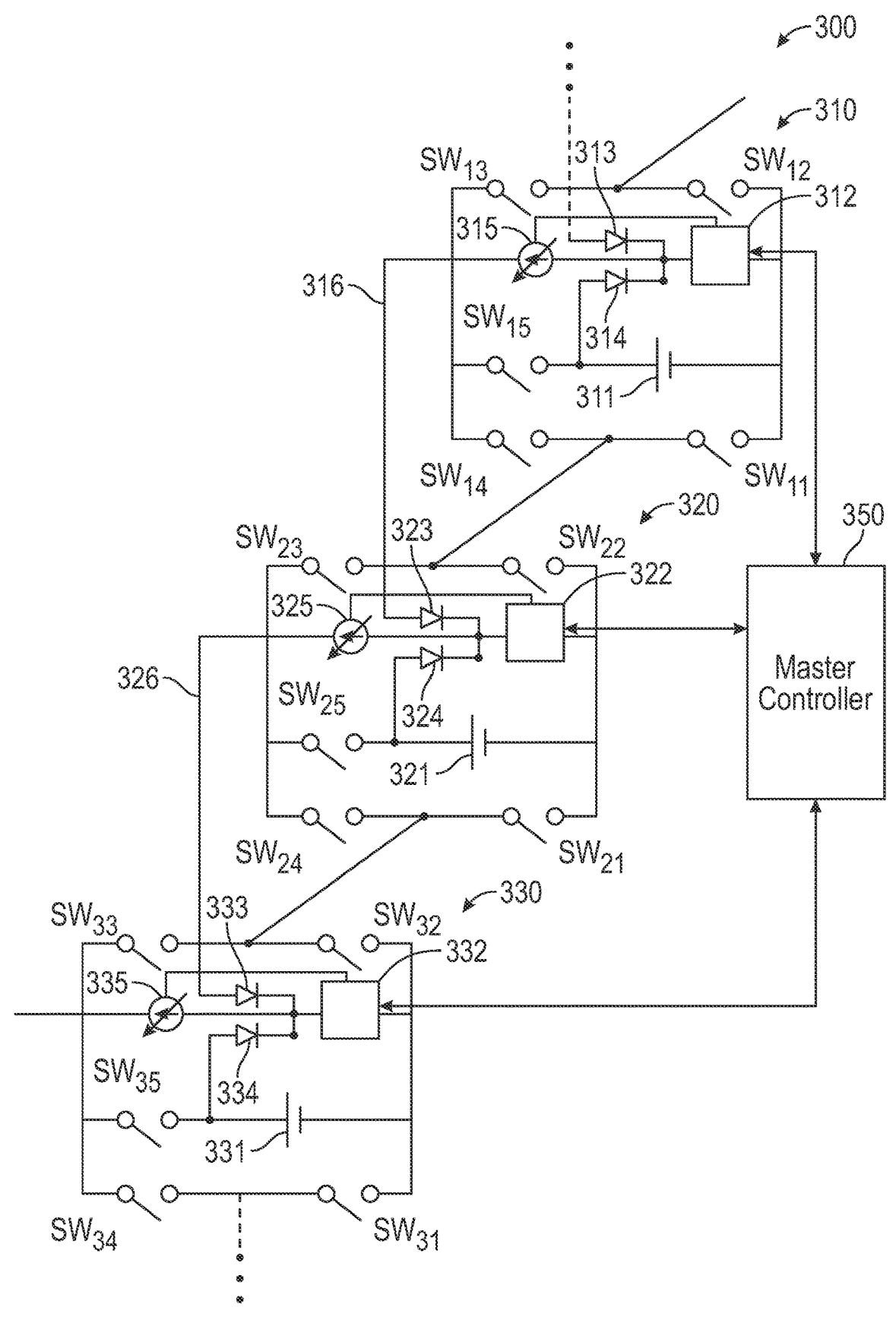
FIG. 3A illustrates example portions of a battery stack with cooperative power sharing.

Cooperative power sharing between modules, as described herein, can provide backup power to malfunctioning modules. FIG. 3A illustrates example portions of a battery stack 300 using AC battery modules as in FIG. 1A with cooperative power sharing. The battery stack 300 may include a plurality of battery modules coupled in a serial configuration; three battery modules 310, 320, 330 are shown for simplicity and illustration purposes only. Battery module 310 may include a battery cell 311 and switches $SW_{11}$-$SW_{15}$, as described above. In addition, battery module 310 may include a controller 312, diodes 313, 314, and a configurable power source 315. The controller 312 may be provided as an integrated circuit, microcontroller, or other suitable control circuit. The configurable power source 315 may be provided as a configurable current source.

Battery module 320 may include a battery cell 321 and switches $SW_{21}$-$SW_{25}$, as described above. In addition, battery module 320 may include a controller 322, diodes 323, 324, and a configurable power source 325. The configurable power source 315 from the first battery module 310 may be coupled to the controller 322 via diode 323 by wire 316. This wire connection can allow the first module 310 to provide backup power to the second battery module 320 in the event battery cell 321 malfunctions, as described in further detail below. In some examples, one or more multiplexors may be used instead of diodes 323, 324 for providing a path for the backup power.

Likewise, battery module 330 may include a battery cell 331 and switches $SW_{31}$-$SW_{35}$, as described above. In addition, battery module 330 may include a controller 332, diodes 333, 334, and a configurable power source 335. The configurable power source 325 from the second battery module 320 may be coupled to the controller 332 via diode 333 by wire 326. This wire connection can allow the second module 320 to provide backup power to the third battery module 330 in the event battery cell 331 malfunctions, as described in further detail below.

In some examples, the modules can provide backup power to neighboring modules without request or instruction. In some examples, a master controller 350 may be coupled to the controllers (312, 322, 332) in the respective modules. The master controller 350 may receive notifications from the controllers in the respective modules. The notifications may include information regarding module operations, such as malfunctions or impairments. The master controller 350 may also transmit instructions to the controllers in the respective modules. The instructions may include instructions to set the switches in the respective modules to operate in a certain polarity (positive, negative) or to a bypass path, as described herein.

Figure 3B:
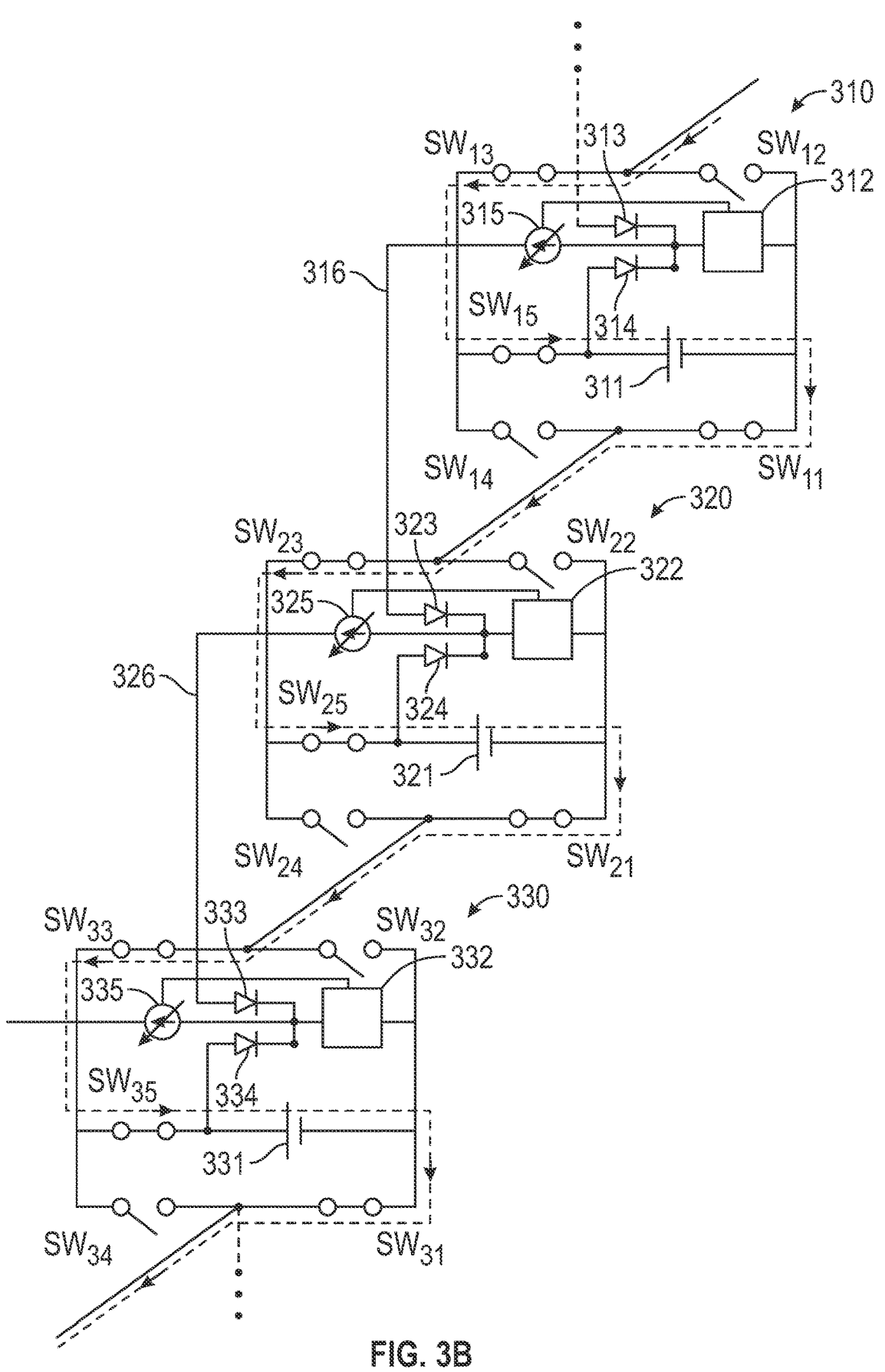
FIG. 3B illustrates example portions of the battery stack in normal operation mode.

FIG. 3B illustrates example portions of the battery stack 300 in normal operation mode. In normal operation mode, each module may be charging its battery cell and providing a current path. FIG. 3B illustrates a positive polarity path. As described above, each module may close the two switches for providing a positive polarity current path, which in this example would be switches $SW_{11}$ and $SW_{13}$ in battery module 310, switches $SW_{21}$ and $SW_{23}$ in battery module 320, and switches $SW_{31}$ and $SW_{33}$ in battery module 330. In the examples with the fifth switch, the fifth switch ($SW_{15}$, $SW_{25}$, $SW_{35}$) may also be turned on. The controllers and switches in each module may be powered by the battery cells in their respective module. For example, controller 312 in module 310 is be powered by battery cells 311 via diode 314 during normal operations mode. The controller 311 may operate switches $SW_{11}$-$SW_{15}$ accordingly.

Figure 3C:
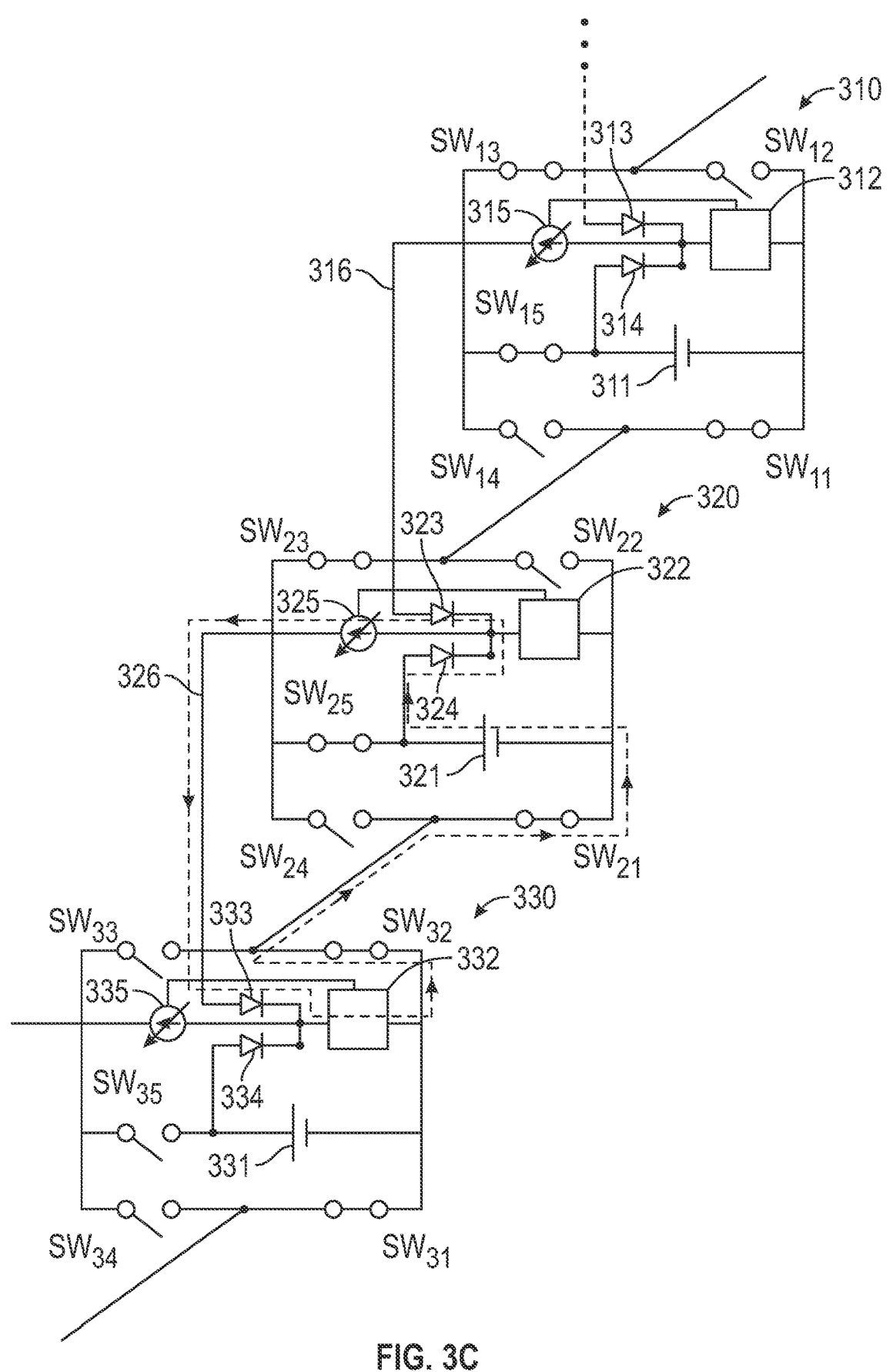
FIG. 3C illustrates example portions of the battery stack during a module malfunction.

FIG. 3C illustrates example portions of the battery stack 300 during a module malfunction. In this example, consider a malfunction with module 330 has occurred such that battery cell 331 is impaired and cannot generate enough power to operate the controller 332 and switches $SW_{31}$-$SW_{35}$ in module 330. Hence, its top neighboring module, which is module 320 in this example, can supply power to module 330 for module 330 to activate its bypass switches $SW_{32}$, $SW_{31}$. Controller 322 of module 320 may control its configurable power source 325 to supply power to controller 332 of module 330 via wire 326 and diode 333. The controller 332 in module 330 may in turn operate switches $SW_{32}$, $SW_{31}$ to provide a bypass route for the malfunctioning battery cell 331. FIG. 3C shows the backup charge path. Module 330 may be taken out of the charging and discharging loop, but the battery stack 300 may continue to operate and provide power to its load, e.g., electric motor. Moreover, the controller 332 may perform other operations as well using the backup power provided by the configurable power source 325. For example, the controller 332 may perform diagnostics, maintain communications with master controller 350, etc., using the backup power.

Figure 4:
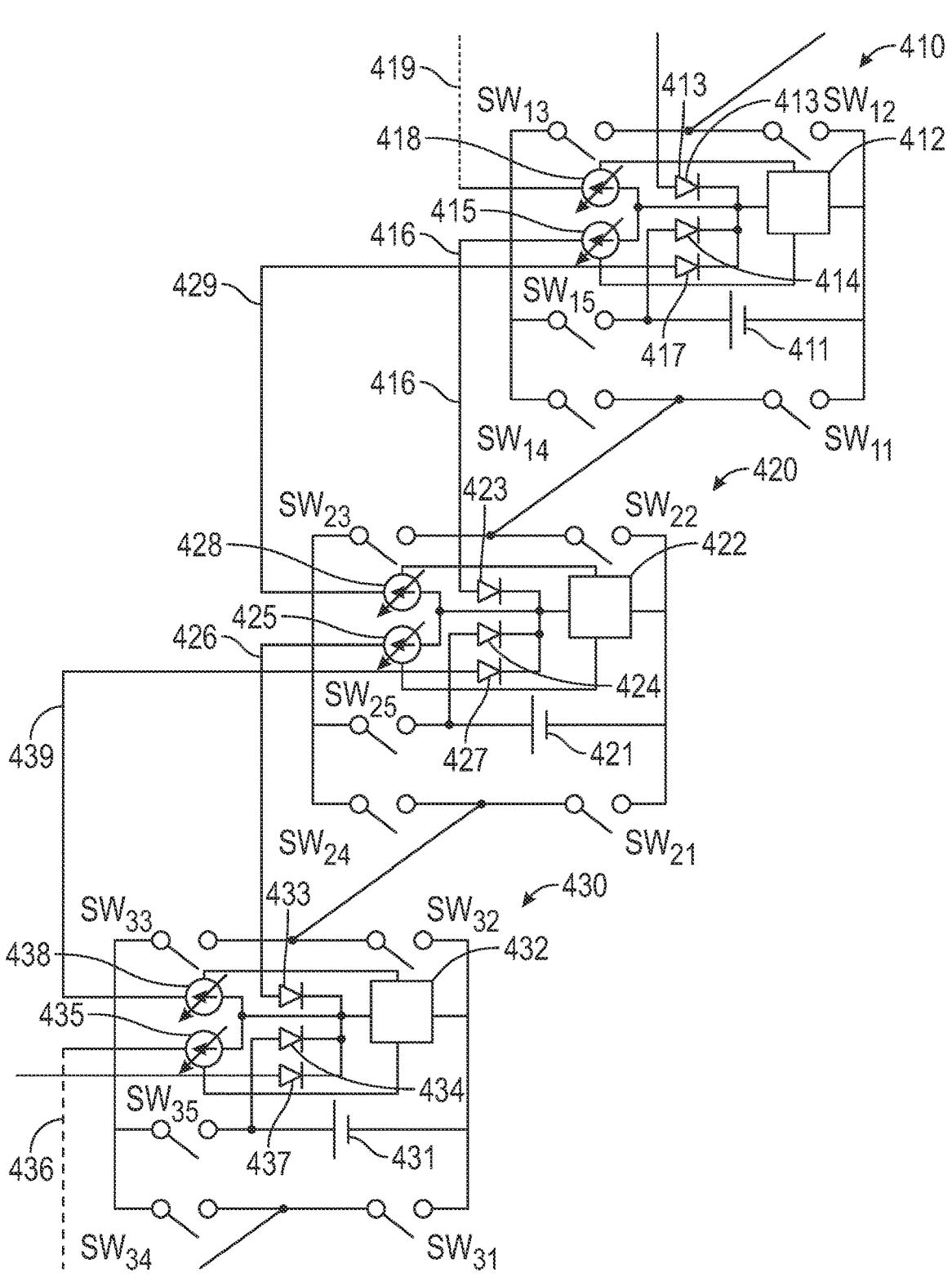
FIG. 4 illustrates example portions of a battery stack with bipolar cooperative power sharing.

FIG. 4 illustrates example portions of a battery stack 400 with bipolar cooperative power sharing. The battery stack 400 may provide cooperate power sharing in both positive and negative polarity configuration. That is, a battery module may be configured to provide backup power to modules in one direction in a positive polarity configuration and to modules in the other direction in a negative polarity configuration. The battery stack 400 may include a plurality of battery modules coupled in a serial configuration; three battery modules 410, 420, 430 are shown for simplicity and illustration purposes only. Battery module 410 may include a battery cell 411 and switches $SW_{11}$-$SW_{15}$, as described above. In addition, battery module 410 may include a controller 412, diodes 413, 414, 417, a first configurable power source 415, and a second configurable power source 418. The controller 412 may be provided as an integrated circuit, microcontroller, or other suitable control circuit. The first and second configurable power sources 415, 417 may be provided as configurable current sources. Configurable power source 415 can provide backup power to its bottom neighboring module 420 via wire 416, as described above, and configurable power source 417 can provide backup power to its top neighboring module (not shown) via wire 419. The other modules 420 and 430 may operate similarly as module 410 and may provide backup power to their respective top and bottom neighboring modules, as described herein. Hence, during both positive and negative phases of the synthesized AC waveform, a malfunctioning module may be bypassed and may be powered by its neighboring modules (top during a positive phase, bottom during a negative phase). Depending on the power requirement to sustain an impaired (bypassed) module, a unipolar cooperative scheme may be sufficient. For example, the module above or below an impaired cell can be configured to appropriate polarity to enable backup power transfer in a 'unipolar' cooperative power scheme. This can occur during all those periods (e.g., light load, vehicle standstill) where the battery is not configured for peak voltage, i.e., all cells aligned in polarity. For those periods of time where a neighboring module is not available to provide backup power, the impaired bypassed module can use stored power.

Moreover, if two or more contiguous modules malfunction, other modules can still provide backup power to the malfunctioning string of modules. For example, if an eighth and ninth modules of a sixteen-module stack are malfunctioning, a seventh module may provide backup power to both the eighth and ninth modules during a positive phase, and tenth module may provide backup power to both the eighth and ninth modules during a negative phase.

Figure 5:
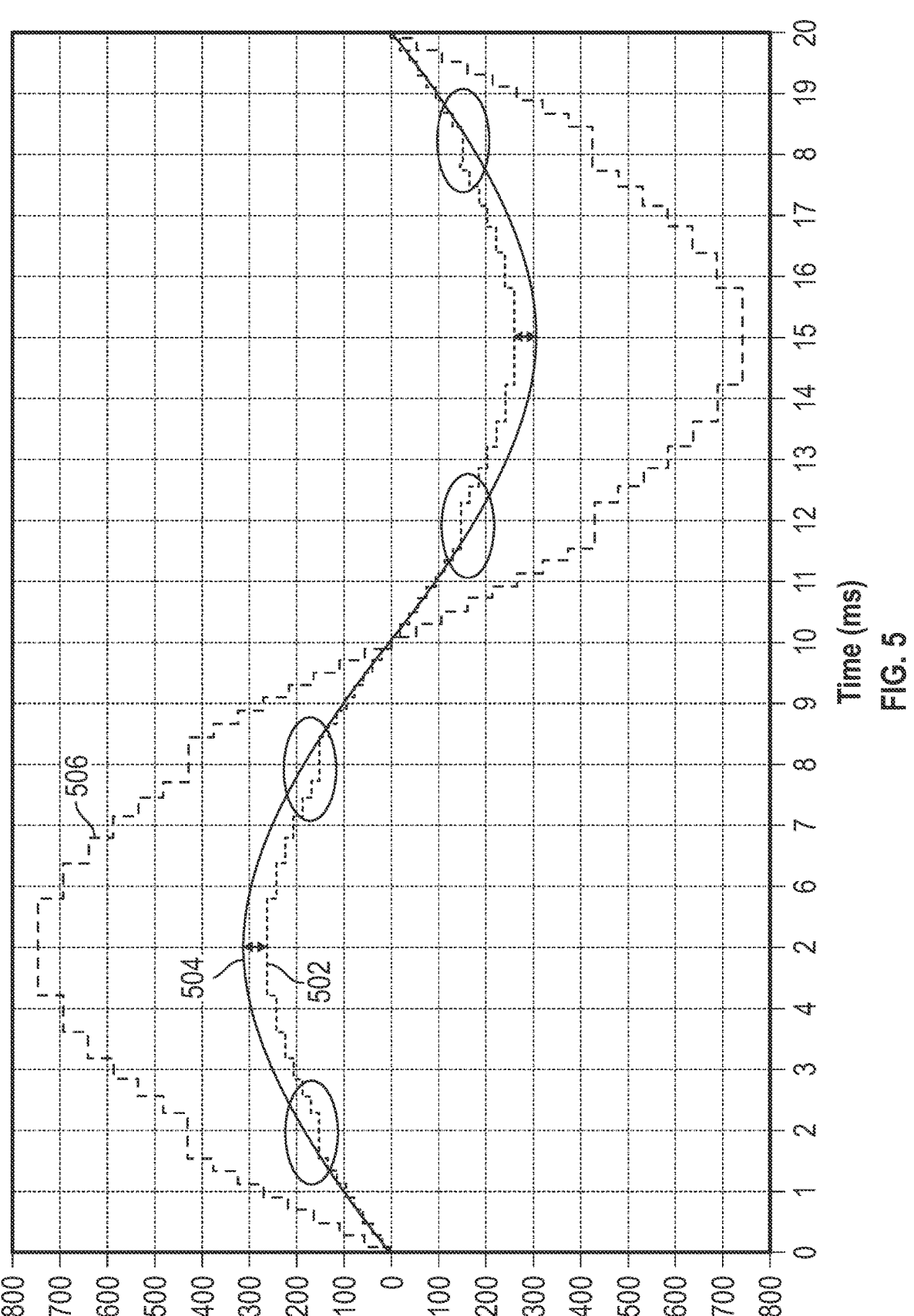
FIG. 5 illustrates an example of a synthesized AC voltage signal generated by an AC battery with malfunctioning modules.

FIG. 5 illustrates an example of a synthesized AC voltage signal generated by an AC battery with malfunctioning modules. A synthesized AC voltage signal 502, an ideal AC voltage signal 504, and a synthesized current signal 506 are shown. In this example, the eighth and ninth modules have been bypassed and therefore the voltages generated by the eighth and ninth modules of the sixteen-module stack is 0V.

As shown, the total voltage of the synthesized AC voltage signal 502 is less than the ideal AC voltage signal 504 because of the malfunctioning modules. However, the battery stack is still operational and generating sufficient AC voltage to power its load, e.g., electric motor, even with the malfunctioning modules because of the cooperative power sharing techniques described herein. In this example, the seventh and tenth modules are providing backup power to one or both of the malfunctioning modules depending on the phase of the synthesized AC waveform.

In some configurations, the top and bottom modules of a battery stack may be supplied backup power in only one polarity configuration. For example, the top module, if it fails, may be supplied power in a negative polarity configuration by one or modules beneath it, but may not be supplied power in a positive polarity configuration because no modules are on top of it. In some scenarios, receiving backup power in only one polarity configuration may be sufficient for operations. In some examples, the top and bottom modules may be coupled to backup isolated power supplies, such as transformers. In these examples, the top and bottom modules can therefore be powered in both polarity configurations in the case of malfunction.

In the above examples, the neighboring module provided backup power directly to the controller of the malfunctioning module by providing a bias current to the controller. This approach provides the benefit of supplying backup power if the malfunctioning module has a catastrophic failure of its battery cell, such as a battery short event. However, in some scenarios, the malfunctioning battery cell may still be somewhat operational. In these scenarios, the neighboring module can provide a current to trickle charge the malfunctioning battery cell to maintain a low state of charge (e.g., 10%). This low state of charge may be sufficient to power the bypass switches of the malfunctioning battery module. The malfunctioning battery module can maintain a "conservation" state where it is not active in the stack charging and discharging, but can still power its module components.

Figure 6:
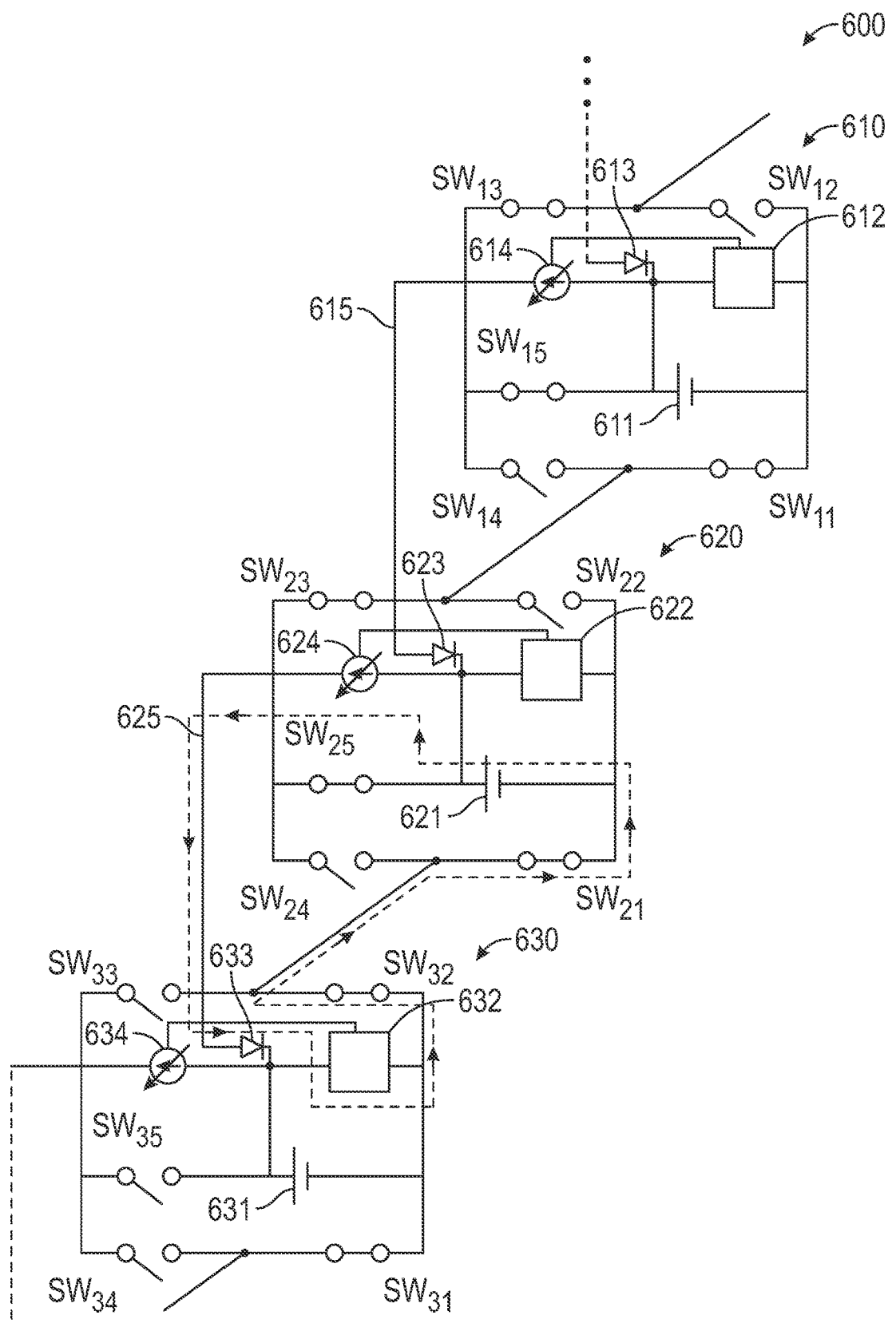
FIG. 6 illustrates example portions of a battery stack with trickle charging techniques.

FIG. 6 illustrates example portions of a battery stack 600 with trickle charging techniques. The battery stack 600 may include a plurality of battery modules coupled in a serial configuration; three battery modules 610, 620, 630 are shown for simplicity and illustration purposes only. Battery module 610 may include a battery cell 611 and switches $SW_{11}$-$SW_{15}$, as described above. In addition, battery module 610 may include a controller 612, a diode 613, and a configurable power source 614. The controller 612 may be provided as an integrated circuit, microcontroller, or other suitable control circuit. The configurable power sources 614 may be provided as a configurable current source. The other modules 620 and 630 may include same components as module 610 described herein.

In this positive polarity string (or stack) example, a neighboring module may provide a current to trickle charge the battery cell of its bottom neighbor's battery cell via wires 615, 625, 635. Unipolarity and bi-polarity strings may also be provided using the techniques described herein.

In the example of shown in FIG. 6, the battery cells within module 630 may be impaired but still functioning. Modules 610, 620 may be operating in a charging state: $SW_{11}$ and $SW_{13}$ in battery module 610 may be closed, and switches $SW_{21}$ and $SW_{23}$ in battery module 620 may be closed. Module 630, on the other hand, may be bypassed and module 620 may provide a current to trickle charge battery cell 631 in the malfunctioning module 630 via configurable power source 624. The current may be carried on wire 625 and couple to the malfunctioning battery cell 631 via diode

633. Thus, the battery stack 600 can continue its normal operations but bypassing the malfunctioning module 630 in a conservation state. This trickle charging approach can maintain conservations state of a malfunctioning battery module to allow for system deep sleep.

In the above examples separate one or two wires were used for the neighbor cell to provide a charging current. However, in some examples, the existing power connections used for charging and discharging a battery stack can also be used to avoid adding additional wires.

Figure 7:
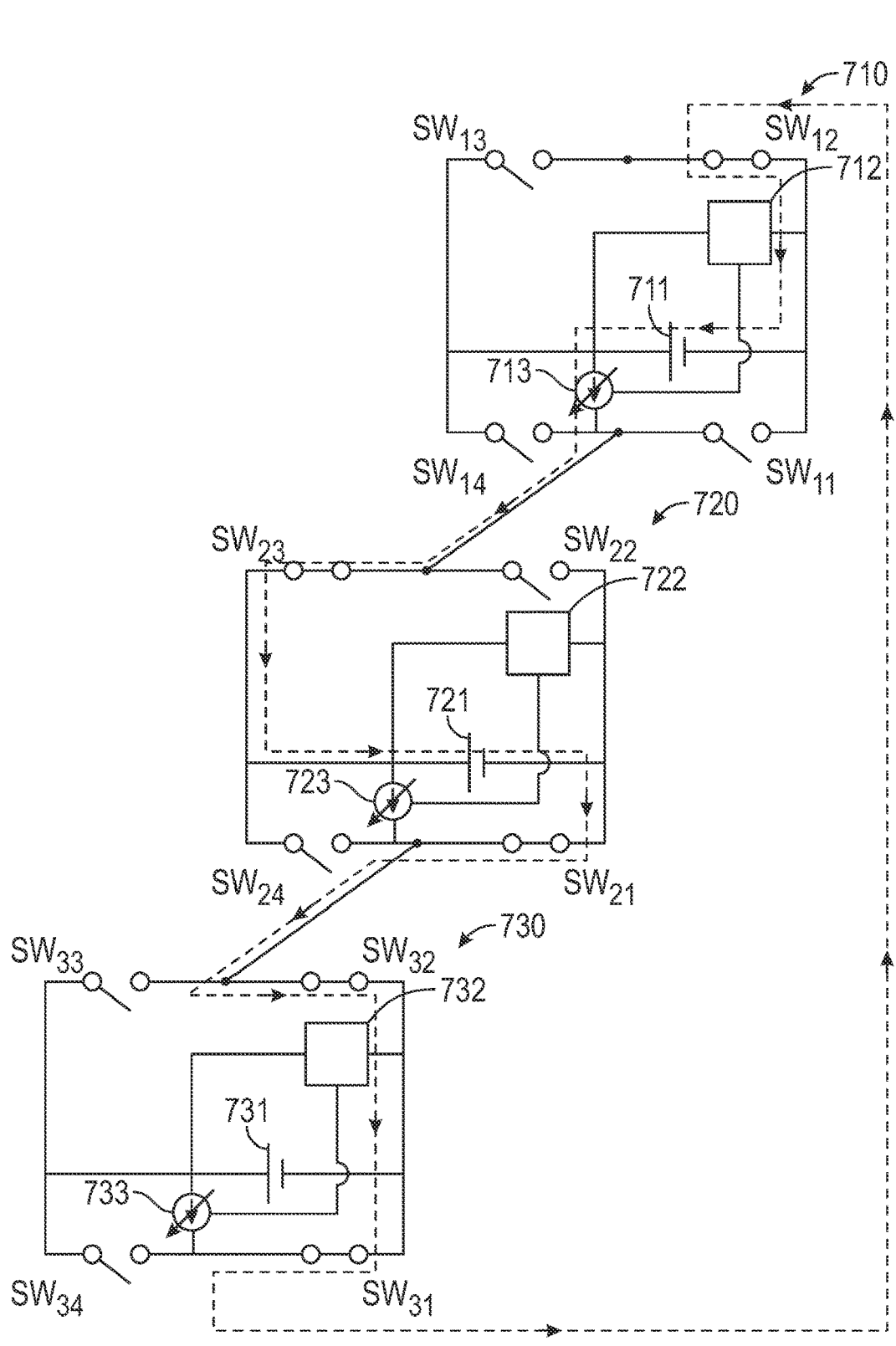
FIG. 7 illustrates example portions of a battery stack with trickle charging techniques using existing power connections.

FIG. 7 illustrates example portions of a battery stack 700 with trickle charging techniques using existing power connections. The battery stack 700 may include a plurality of battery modules coupled in a serial configuration; three battery modules 710, 720, 730 are shown for simplicity and illustration purposes only. Battery module 710 may include a battery cell 711 and switches $SW_{11}$-$SW_{14}$ (optional $SW_{15}$ may also be included) as described above. In addition, battery module 710 may include a controller 712 and a configurable power source 713. The controller 712 may be provided as an integrated circuit, microcontroller, or other suitable control circuit. The configurable power sources 713 may be provided as a configurable current source. The other modules 720 and 730 may include same components as module 710 described herein.

In this example, the battery cells within module 720 may be impaired, but still functioning. To be able to charge the malfunctioning module 720 from a neighboring module, other modules may be bypassed to connect the cathodes of the discharging and charging cell. Here, in the first module 710, switch $SW_{12}$ may be closed and the other switches in that module may be open, so that the configurable power source 713 may provide the current for the malfunctioning module 720. The current from the configurable power source 713 may travel over existing power connections of the charge loop. For example, switches $SW_{23}$ and $SW_{21}$ may be closed in malfunctioning module 720 to trickle charge the malfunctioning battery cell 721. Moreover, module 730 may be set to bypass state with switches $SW_{32}$ and $SW_{31}$ closed to provide a closed loop for the charging and discharging of the malfunctioning battery cell 721. This approach may be useful for when a EV battery is in standby (e.g., disconnected from motor) because of the bypassing of the other modules. Module 720 will revert to a bypassed state ($SW_{22}$ and $SW_{21}$, or $SW_{23}$ and $SW_{24}$, closed) to finish trickle charging and revert to normal operation.

The backup power techniques described herein can be used for AC and DC batteries. For DC battery configurations as illustrated in FIG. 1C, one or more bypass switches may be provided back-to-back in a bypass route in parallel with the battery cell. A back-to-back safety switch (similar to SW5 A/B) may also be provided in series with the battery cell.

Various Notes

Each of the non-limiting examples above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspects are still deemed to fall within the scope of that aspect. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure.

The invention claimed is:

1. A battery circuit comprising:
  a first battery cluster of a battery stack, the first battery cluster including:
    a first battery cell,
    a first controller,
    a first set of switches coupled to the first battery cell to selectively couple the first battery cell to perform charging and discharging operations, and
    a configurable power source;
  a second battery cluster of the battery stack, the second battery cluster including:
    a second battery cell,
    a second controller, and a second set of switches coupled to the second battery cell to selectively couple the second battery cell to perform charging and discharging operations;
  wherein in the event the second battery cell is impaired, the configurable power source in the first battery cluster is configured to provide backup power to the second battery cluster to operate the second set of switches to bypass the second battery cell from the charging or discharging operations,
  wherein the configurable power source is coupled to the second battery cluster via a wire separate from a charging loop for performing charging and discharging operations.

2. The battery circuit of claim 1, wherein the second battery cluster includes a first diode to allow the second battery cell to provide power to the second controller during normal operation mode.

3. The battery circuit of claim 2, wherein the second battery cluster includes a second diode to allow the configurable power source in the first battery cluster to provide backup power to the second controller when the second battery cell is impaired.

4. The battery circuit of claim 1, wherein the configurable power source is a first configurable power source and wherein the first configurable power source is configured to provide backup power to the second battery cluster in a first polarity configuration;
  the battery circuit further comprising:
  a third battery cluster of the battery stack including a second configurable power source to provide backup power to the second battery cluster in a second polarity configuration.

5. The battery circuit of claim 1, wherein the configurable power source includes a current source.

6. The battery circuit of claim 1, wherein the first set of switches includes four switches arranged in a H bridge configuration.

7. The battery circuit of claim 1, wherein the battery stack is a DC battery, and the first set of switches include at least one by-pass switch.

8. The battery circuit of claim 1, wherein the configurable power source is configured to provide backup power directly to the second controller in the second battery cluster.

9. The battery circuit of claim 1, wherein the configurable power source is configured to provide backup power to the second battery cell in the second battery cluster for trickle charging.

10. The battery circuit of claim 1, wherein a topmost battery cluster of the battery stack is coupled to an isolated power supply to provide backup power to the topmost battery cluster.

11. The battery circuit of claim 1, wherein the configurable power source is coupled to the second battery cluster via a charging loop for performing charging and discharging operations.

12. A method to provide safe operations of a battery stack, the method comprising:
  determining that a first module of a plurality of battery modules of the battery stack is impaired;
  providing backup power to the first module from a configurable power source in a second module of the plurality of battery modules based on determining that the first module is impaired; and
  removing the first module from a charge loop associated with the battery stack using the backup power provided by the configurable power source, wherein the configurable power source is coupled to the first battery module via a wire separate from the charge loop.

13. The method of claim 12, wherein the configurable power source in the second battery module provides backup power to the first battery module in a first polarity configuration and wherein another configurable power source in a third battery module of the plurality of battery modules provides backup power to the first battery module in a second polarity configuration.

14. The method of claim 12, wherein the configurable power source provides backup power directly to a controller in the first battery module.

15. The method of claim 12, wherein the configurable power source provides backup power to battery cell in the first battery module for trickle charging.

16. A battery module of a battery stack, the battery module comprising:
    a battery cell,
    a controller,
    a set of switches coupled to the battery cell to selectively couple the battery cell to perform charging and discharging operations of the battery stack, and
    a configurable power source to provide backup power to a neighboring module in the event the neighboring module is impaired,
    wherein the configurable power source is coupled to the neighboring module via a wire separate from a charging loop for performing the charging and discharging operations.

17. The battery module of claim 16, wherein the configurable power source includes a current source.

\* \* \* \* \*